(12) United States Patent
Nassi et al.

(10) Patent No.: US 10,915,327 B2
(45) Date of Patent: Feb. 9, 2021

(54) APPARATUS AND METHOD OF DISPATCHING INSTRUCTIONS FOR EXECUTION CLUSTERS BASED ON DEPENDENCIES

(71) Applicant: Arm Limited, Cambridge (GB)

(72) Inventors: Luca Nassi, Antibes (FR); Remi Marius Teyssier, Le Bar sur Loup (FR); François Donati, Antibes (FR); Damian Maiorano, Juan-les-Pins (FR)

(73) Assignee: Arm Limited, Cambridge (GB)

( * ) Notice: Subject to any disclaimer, the term of this patent is extended or adjusted under 35 U.S.C. 154(b) by 47 days.

(21) Appl. No.: 16/220,050

(22) Filed: Dec. 14, 2018

(65) Prior Publication Data
US 2020/0192674 A1    Jun. 18, 2020

(51) Int. Cl.
| G06F 9/38 | (2018.01) |
| G06F 9/30 | (2018.01) |
| G06F 9/48 | (2006.01) |

(52) U.S. Cl.
CPC ........ *G06F 9/3851* (2013.01); *G06F 9/30145* (2013.01); *G06F 9/3836* (2013.01); *G06F 9/3838* (2013.01); *G06F 9/3891* (2013.01); *G06F 9/4843* (2013.01)

(58) Field of Classification Search
CPC .................................................. G06F 9/3836
See application file for complete search history.

(56) References Cited

U.S. PATENT DOCUMENTS

| 6,167,503 | A  | * | 12/2000 | Jouppi ................... | G06F 9/3012 |
|           |    |   |         |                          | 712/23      |
| 10,268,482 | B2 | * | 4/2019 | Barrick ................. | G06F 9/3851 |
| 2008/0133893 | A1 | * | 6/2008 | Glew .................... | G06F 9/3012 |
|           |    |   |         |                          | 712/220     |
| 2013/0007415 | A1 | * | 1/2013 | Babayan ............... | G06F 9/3016 |
|           |    |   |         |                          | 712/205     |
| 2016/0202986 | A1 | * | 7/2016 | Ayub .................... | G06F 9/3802 |
|           |    |   |         |                          | 712/206     |
| 2017/0351523 | A1 | * | 12/2017 | Carlough .............. | G06F 9/3828 |
| 2017/0357513 | A1 | * | 12/2017 | Ayub .................... | G06F 9/3836 |
| 2018/0107510 | A1 | * | 4/2018 | Carlough ............... | G06F 15/76 |
| 2019/0095203 | A1 | * | 3/2019 | Pediaditaki ......... | G06F 12/0846 |

* cited by examiner

*Primary Examiner* — Jacob Petranek
(74) *Attorney, Agent, or Firm* — Nixon & Vanderhye P.C.

(57) ABSTRACT

Aspects of the present disclosure relate to an apparatus comprising a plurality of clusters, each cluster having a plurality of execution units to execute instructions. The apparatus comprises dispatch circuitry to determine, for each instruction to be executed, a chosen cluster from amongst the plurality of clusters to which to dispatch that instruction for execution. This determination is performed by selecting between a default dispatch policy wherein said chosen cluster is a cluster to which an earlier instruction to generate at least one source operand of said instruction was dispatched for execution, and an alternative dispatch policy for selecting said chosen cluster. Said selecting is based on a selection parameter. The dispatch circuitry is further configured to dispatch said instruction to the chosen cluster for execution.

15 Claims, 3 Drawing Sheets

APPARATUS AND METHOD OF DISPATCHING INSTRUCTIONS FOR EXECUTION CLUSTERS BASED ON DEPENDENCIES

BACKGROUND

The present technique relates to the field of processing devices.

Some processing devices have a plurality of parallel clusters, with each cluster having a plurality of execution units. Instructions to be executed can be dispatched to different ones of these clusters and executed in parallel. Overall processing capabilities are thereby improved relative to systems in which parallel execution clusters are not implemented. However, it would be desirable to further improve the performance of such systems.

SUMMARY

At least some examples provide an apparatus comprising:
a plurality of clusters, each cluster having a plurality of execution units to execute instructions; and
dispatch circuitry to:
determine, for each instruction to be executed, a chosen cluster from amongst the plurality of clusters to which to dispatch that instruction for execution, by selecting between:
a default dispatch policy wherein said chosen cluster is a cluster to which an earlier instruction to generate at least one source operand of said instruction was dispatched for execution; and
an alternative dispatch policy for selecting said chosen cluster,
said selecting being based on a selection parameter, and
dispatch said instruction to the chosen cluster for execution.

Further examples provide an apparatus comprising:
a plurality of clusters, each cluster having a plurality of execution means for executing instructions; and
dispatch means for:
determining, for each instruction to be executed, a chosen cluster from amongst the plurality of clusters to which to dispatch that instruction for execution, by selecting between:
a default dispatch policy wherein said chosen cluster is a cluster to which an earlier instruction to generate at least one source operand of said instruction was dispatched for execution; and
an alternative dispatch policy for selecting said chosen cluster,
said selecting being based on a selection parameter, and
dispatching said instruction to the chosen cluster for execution.

Further examples provide a method comprising:
for each of a plurality of received instructions to be executed by a plurality of execution clusters, determining a chosen cluster from amongst the plurality of clusters to which to dispatch that instruction for execution, by selecting between:
a default dispatch policy wherein said chosen cluster is a cluster to which an earlier instruction to generate at least one source operand of said instruction was dispatched for execution; and
an alternative dispatch policy for selecting said chosen cluster, and dispatching said instruction to the chosen cluster.

Further aspects, features and advantages of the present technique will be apparent from the following description of examples, which is to be read in conjunction with the accompanying drawings.

DESCRIPTION OF EXAMPLES

Figure 1:
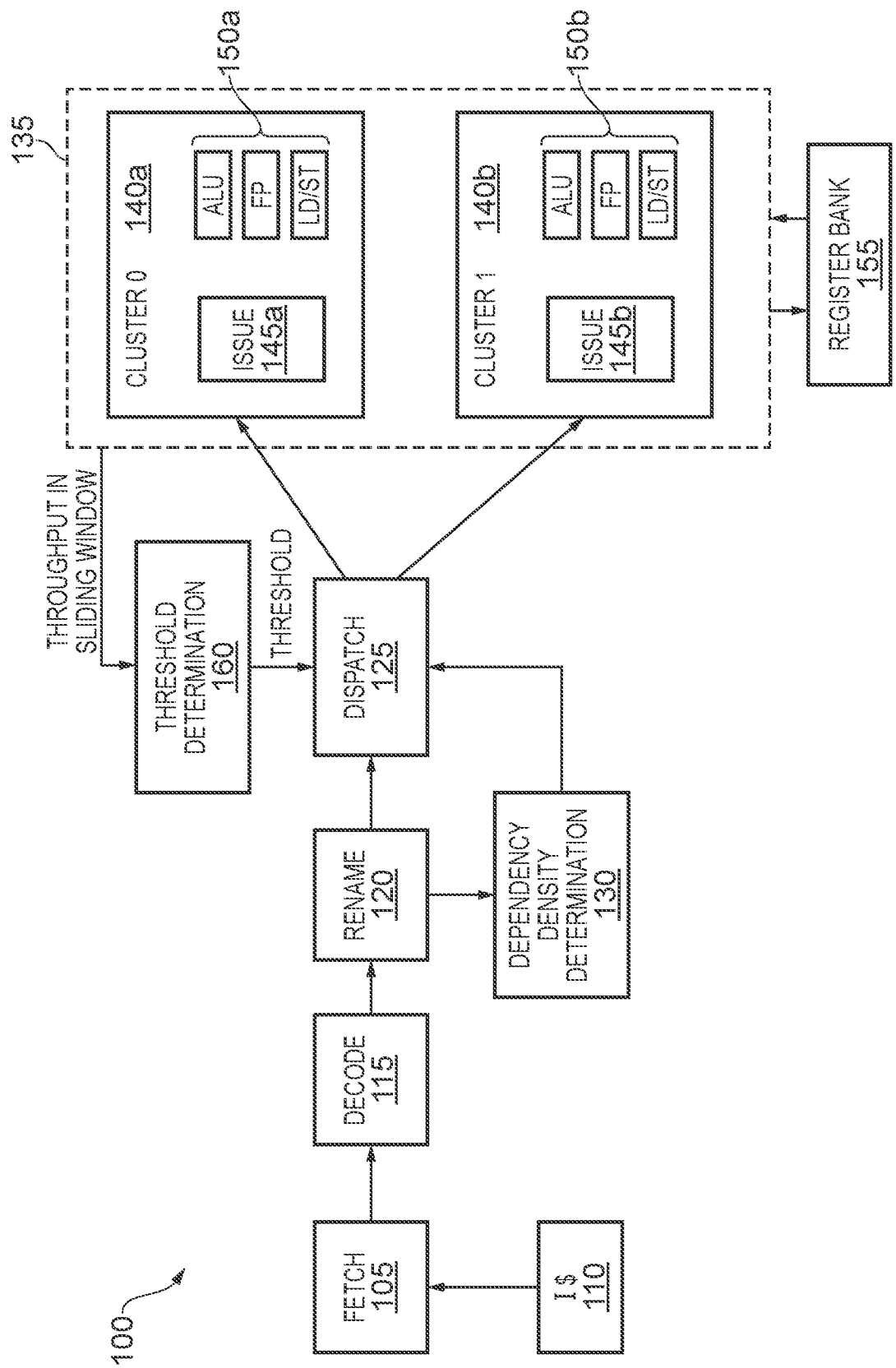
FIG. 1 schematically depicts an apparatus according to an example implementation.

As described above, a processing apparatus can comprise a plurality of clusters, each cluster having a plurality of execution units to execute instructions. At least some of the instructions can be dependent instructions, which take as a source operand the result value produced by an earlier instruction. In many such apparatuses, communications within one cluster are relatively fast, but a time penalty is associated with communications between clusters relative to transmission of signals between execution units of a given cluster of the plurality of clusters. For example, this may arise from the physical length of the connections between different clusters, such that a communication cannot be processed and passed to another cluster within one clock cycle. A delay of (for example) one clock cycle may thus be introduced for communications between clusters.

The processing apparatus further comprises dispatch circuitry. The dispatch circuitry is configured to determine, for each instruction to be executed, a chosen cluster from amongst the plurality of clusters to which to dispatch that instruction for execution. In accordance with the techniques described herein the determination involves making a selection between a default dispatch policy and an alternative dispatch policy.

According to the default dispatch policy, the chosen cluster is a cluster to which an earlier instruction to generate at least one source operand required by a current instruction under consideration was dispatched for execution. The current instruction is therefore a dependent instruction. By using the default dispatch policy, the source operand can thus be efficiently provided as an input to the current instruction, even where the earlier instruction was executed sufficiently recently that its output is not yet stored in a storage (such as a register bank) accessible to the plurality of clusters. For example, the output of the earlier instruction may be fed directly back to an execution unit executing the current instruction with minimal delay, due to the current instruction and the earlier instruction being executed within the same cluster.

The selecting between the default and alternative dispatch policies is based on a selection parameter. Examples of alternative dispatch policies, and of particular selection parameters, are described in more detail below. In general, the use of an alternative dispatch policy allows the default dispatch policy to be deviated from, for example in situations in which it may be more efficient to dispatch a given instruction to a cluster other than the cluster that would be identified by the default policy. As an example, always adopting the default policy when dispatching dependent instructions could lead to a significant imbalance in workload between the clusters, and in such instances it may be more efficient to dispatch one or more dependent instructions to a different cluster to that which would be chosen using the default policy, in order to seek to more evenly balance the load between clusters. In particular, despite the delay that would be incurred in forwarding information between clusters as discussed earlier, it may be possible to improve overall performance by such an approach, as more parallelism can be exploited.

Following selection between the default and alternative dispatch policies for a given instruction, and consequently choosing a cluster according to the selected dispatch policy, the apparatus dispatches that instruction to the chosen cluster for execution. Overall processing performance may thereby be improved relative to comparative systems in which a default dispatch policy is followed without deviation for dependent instructions.

In an example, the aforementioned selection parameter is based on dependency information associated with instructions received by the dispatch circuitry. The selection of a given dispatch policy can thus depend on details of the dependencies of incoming instructions. For example, the dependency information may be an indication of a dependency density, quantifying the degree of dependency in the received instructions. An example of a numerical metric of dependency density is the average dependence distance of the instructions received by the dispatch circuitry, i.e. the average number of instructions "into the past" on which received instructions depend. For example, in some instances the dispatch circuitry may be configured to select the alternative dispatch policy responsive to a determination that the dependency density is below a threshold.

The apparatus can therefore take into account that when executing instructions with a high dependency density (i.e. which tend to depend on very recent instructions), the delay in propagating information between clusters is likely to have a bigger impact on performance. This may for example be the case since the source operands are less likely to already be available in shared storage (such as registers) accessible to all clusters at the time the dependent instruction is executed, as a certain number of processing cycles is required to perform this storage. Bearing in mind the time penalty associated with transmissions between clusters, it may therefore be advantageous to dispatch these instructions according to the default dispatch policy, even if this results in uneven load balancing between the clusters. Source operands can thus be provided directly as inputs, for example by feeding back generated results over forwarding paths within a single cluster.

Conversely, when executing instructions with a lower dependency density (i.e. which tend to depend on less recent instructions), the time penalty is likely to be less significant. For instance the source operands are more likely to already be available in the shared storage and thus accessible to all clusters without the time penalty associated with transmissions between clusters. Even if forwarding paths are still used rather than accessing the shared storage, and hence the extra delay is incurred, there is more chance that the extra delay can effectively be accommodated without impacting performance, since there is more of a gap in the instruction sequence between the earlier instruction producing the source operand and the later, dependent, instruction consuming the source operand, and hence less time constraints in making the source operand available. It may therefore be advantageous in these situations to dispatch such instructions based on an alternative dispatch policy that seeks to balance processing workload between the plurality of clusters.

As mentioned above, the dispatch circuitry may determine whether the dependency density is below (or above) a threshold. In one such example, the clusters are configured to feed back to the threshold determination circuitry performance information associated with executed instructions. The threshold determination circuitry is then configured to dynamically update the threshold based on the fed back performance information. The threshold can thus be adjusted to control the tendency to dispatch instructions to the same cluster (averting the risk of time penalties associated with transmissions between clusters, but risking causing a bottleneck and potentially filling an issue queue of one cluster whilst other clusters have spare capacity) vs. sending instructions to different clusters (taking advantage of parallel processing but risking incurring time penalties associated with transmissions between clusters). This control can be performed to seek to improve overall performance of the plurality of clusters.

In an example the dispatch circuitry is configured to perform the aforementioned selecting responsive to a determination of a dispatch inhibiting event associated with said instruction. Conversely, if a lack of a dispatch inhibiting event is determined, the dispatch circuitry dispatches the instruction according to the default dispatch policy. The default policy can thus be followed unless a dispatch inhibiting event is determined, responsive to which the dispatch circuitry performs the previously described selection process between the default and alternative dispatch policies. As an example, the dispatch inhibiting event may be that the chosen cluster according to the default dispatch policy is currently unable to accept the instruction in question, for example because it has a full issue queue, or because there is a limit on how many instructions can be received per cycle by its issue queue and that quota has already been reached. In other words, at the time of determining where to dispatch a given instruction, that instruction can be dispatched according to the default policy if the default cluster is able to accept the instruction. Otherwise, the dispatch circuitry can select between either dispatching the instruction according to the alternative policy, or waiting until it can dispatch the instruction according to the default policy (for example because the issue queue of the default cluster is no longer full). As described above, this selection can be based for example on the dependency density associated with received instructions. Processing performance can thereby be improved by balancing instructions across clusters when the dependency density is low, such that the dispatch circuitry does not stall until all the issue queues of all clusters are full, but dispatching instructions to the default cluster (even if this means waiting for that cluster to be available) if dependency density is sufficiently high that the balancing would be detrimental to system performance by incurring penalties associated with transmissions between clusters.

In an example, which may be implemented in combination with the aforementioned determination based on presence of a dispatch inhibiting event, the dispatch circuitry is configured to perform the selecting between dispatch policies in dependence on a determination of dependency sensitivity of a given received instruction. For example, the dispatch circuitry may be configured to determine the dependency sensitivity of a received instruction responsive to a determination that an earlier instruction, that is to generate at least one source operand of the instruction in question, has not yet completed execution. As explained above, the output of this earlier instruction would not yet be available in shared storage such as a register, and thus providing that output via a feedback process to a different cluster would incur a time penalty. Similarly, the dispatch circuitry may be configured to determine a lack of dependency sensitivity of a received instruction if each source operand for that received instruction is stored in a corresponding register of the apparatus. The present example therefore allows the selection process to be performed where a dependency issue is present, such that a time penalty could be incurred if the instruction was dispatched to a cluster other than the default cluster.

Alternatively or additionally, the dispatch circuitry may be configured, responsive to a determination of a lack of dependency sensitivity of said received instruction, to dispatch the received instruction to one of the plurality of clusters to seek to balance workload between the plurality of clusters. Therefore, if no dependency issue is present, such that the instruction could be dispatched to any cluster without incurring the aforementioned time penalty, the instruction can be dispatched to balance workload and thereby more efficiently make use of the parallel execution clusters.

Particular examples of the present disclosure will now be described with reference to the Figures.

FIG. 1 schematically depicts an apparatus 100 according to an example of the present disclosure. The apparatus 100 implements a processing pipeline.

The apparatus comprises a fetch unit 105 configured to fetch instructions to be executed from memory (for example via an intervening instruction cache 110). The fetch unit transmits the fetched instructions to a decode unit 115, which decodes received instructions and transmits them to a rename unit 120. The rename unit 120 performs a register renaming process, and transmits the decoded instructions to a dispatch unit 125. In particular, in this example implementation it is assumed that there are a larger number of physical registers in the register bank 155 than there are architectural (logical) registers that can be specified by instructions, and the use of register renaming allows the elimination of false data dependencies arising from the reuse of architectural registers by successive instructions that do not have any real data dependencies between them (by mapping multiple instances of one architectural register to different physical registers), thereby allowing increased use of out of order execution of instructions to improve overall performance. It will be appreciated that in alternative implementations there may not be any register renaming and in that event the decoded instructions can be forwarded directly to the dispatch unit 125.

In addition to performing the register renaming, the rename unit 120 also provides dependency information associated with the instructions to a dependency density determination unit 130. In particular, the rename unit is already assessing presence of dependencies when deciding how to rename registers, and hence can readily provide dependency information to the dependency density determination unit. In implementations where register renaming is not used, then details of the registers used by each decoded instruction can be provided to the dependency density determination unit directly from the decode unit 115.

The dependency density determination unit 130 then determines a dependency density associated with received instructions, which may for example be an average dependence distance as described above.

The apparatus comprises execution circuitry 135 comprising a first execution cluster 140a and a second execution cluster 140b. Each execution cluster 140a, 140b comprises issue circuitry 145a, 145b implementing an issue queue, and execution units 150a, 150b, for example including an arithmetic logic unit (ALU), a floating point unit (FP), and a load/store unit (LD/ST). Whilst a single issue queue may be used in each cluster, in an alternative implementation there may be separate issue queues for each execution unit.

A time penalty is associated with transmissions between the clusters 140a, 140b relative to transmission of signals between execution units of a given cluster. For example, a transmission of the output of the ALU of the first cluster 140a to the load/store unit of the first cluster 140a would not incur the time penalty, but a transmission of the output of the ALU of the first cluster 140a to the load/store unit of the second cluster 140b would incur the time penalty.

The dispatch unit 125 determines a chosen cluster of the first and second clusters 140a, 140b to dispatch a current instruction to, by applying a selection process as set out above and described in relation to FIG. 2 below. This selection process can lead to selection of a default cluster (in which earlier instructions to generate source operands of the current instruction were executed) or an alternative cluster. The selection is based on the dependency density that is determined by the dependency density determination unit 130: if the dependency density is above a threshold, the dispatch unit 125 dispatches a given instruction to the default cluster even if this means waiting for the issue queue 145 of that cluster to not be full. Conversely, if the dependency density is below the threshold, the dispatch unit 125 dispatches the instruction to an alternative cluster instead of waiting for the issue queue 145 of the default cluster to not be full.

As mentioned earlier, the apparatus comprises a register bank 155 accessible to the execution clusters 140a, 140b. The clusters' load/store units can be used to move data between the register bank 155 and memory (not shown in FIG. 1), by performing load operations to load data into the registers of the register bank from memory, and performing store operations to store data from the register to memory. Accesses to the register bank 155 do not incur the aforementioned time penalty, such that instructions for which the source operands are stored in the register bank can be dispatched to any cluster without incurring the time penalty.

The execution circuitry 135 provides an indication of its instruction throughput (which could for example be measured in terms of the number of instructions executed, or committed), averaged over a sliding window, to a threshold determination unit 160. The threshold determination unit 160 determines an updated threshold value to maximise instruction throughput. For example, if increasing the threshold is observed to decrease throughput, the threshold determination unit determines a new, lower, threshold. This updated threshold is provided to the dispatch unit 125 for use in selecting a cluster to which to dispatch future instructions.

Figure 2:
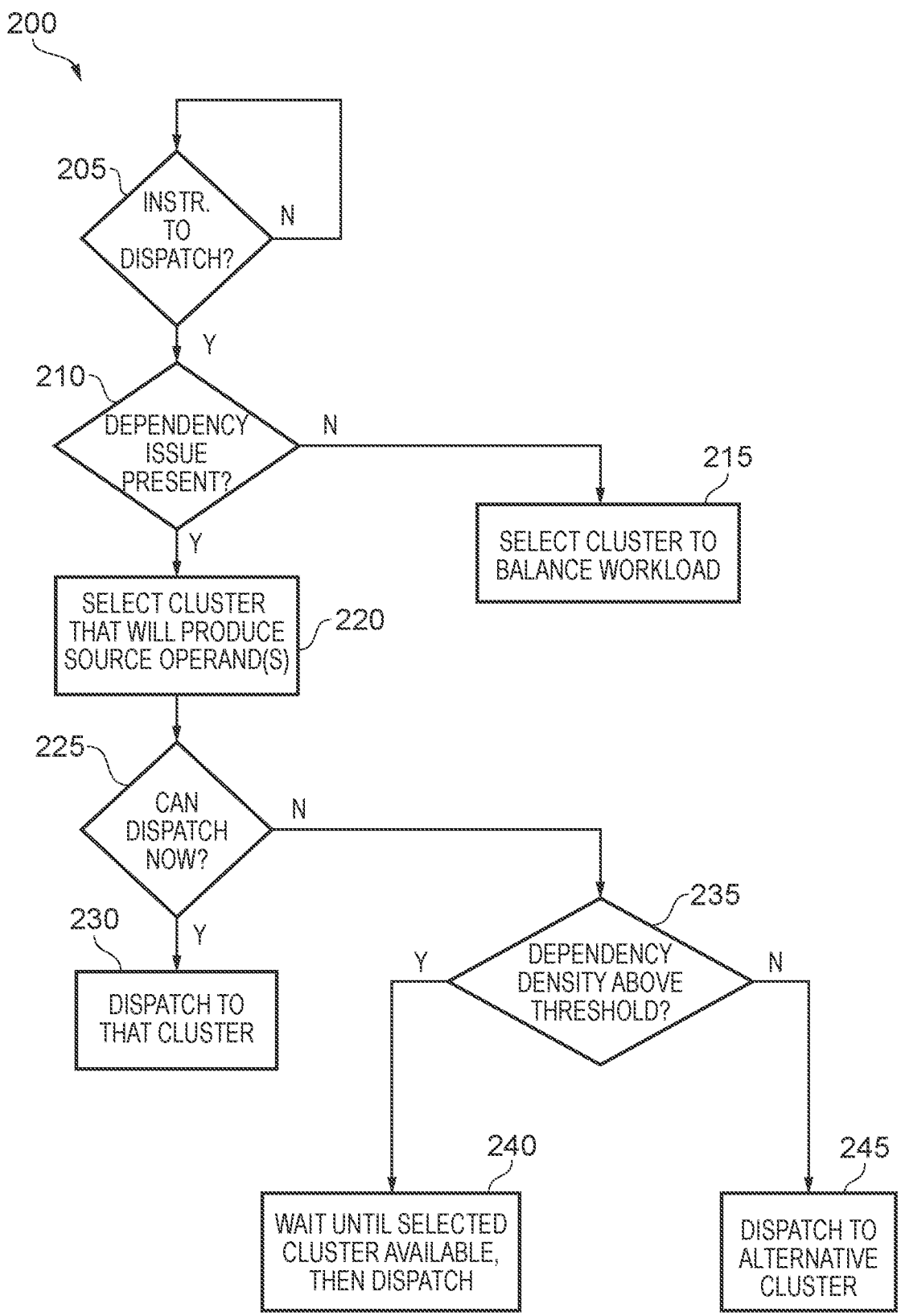
FIG. 2 schematically illustrates a method for selecting a cluster to which to dispatch an instruction according to one example approach.

FIG. 2 schematically illustrates a method 200 for selecting a cluster to which to dispatch an instruction according to an example of the present disclosure. The method 200 can be implemented by the dispatch unit 125 of FIG. 1.

At block 205 it is determined whether there is an instruction to dispatch. When there is an instruction to dispatch, flow proceeds to block 210.

At block 210 it is determined whether a dependency issue is present for the instruction in question. For a dependent instruction, no dependency issue is present if all source operands for the instruction are available in a shared storage accessible to all clusters, such as the register bank 155 of apparatus 100. Conversely, a dependency issue is present if at least one source operand is not yet available in the shared storage, for example because the earlier instruction to generate that operand is still being executed by an execution cluster.

If no dependency issue is present, flow proceeds to block 215 where an execution cluster is selected to balance workload: because all source operands are available without a time penalty, there is no advantage to selecting any particular cluster.

If a dependency issue is present, such that at least one source operand is to be provided directly from an execution unit of the cluster executing the earlier instruction and not retrieved from a shared storage, flow proceeds to block 220 in which the cluster that will produce that source operand is selected. This cluster is the default cluster to which to dispatch the current instruction, because the above-mentioned time penalty would not be associated with providing the source operand directly from an execution unit of that cluster.

At block 225 it is determined whether the instruction can be dispatched at the present time. For example, this may not be possible if the issue queue of the default cluster is full.

If the instruction can be dispatched at the present time, flow proceeds to block 230 where it is dispatched to the default cluster.

If the instruction cannot be dispatched at the present time, flow proceeds to block 235 where it is determined whether the dependency density, for example determined by the dependency density determination unit 130 of apparatus 100, is above a threshold. The threshold may for example be provided from the threshold determination unit 160 of apparatus 100.

If the dependency density is above the threshold, suggesting that significant time penalties would be incurred if instructions were dispatched to clusters other than their default cluster, flow proceeds to block 240. At block 240, it is waited until the default cluster is available, at which time the instruction is dispatched to the default cluster.

If the dependency density is below the threshold, suggesting that that the performance advantage from spreading workload across the parallel clusters would outweigh the detrimental effect of incurring some time penalties, flow proceeds to block 245. At block 245, the instruction is dispatched to an alternative cluster. For example, the alternative cluster may be selected to balance workload across the clusters.

Figure 3:
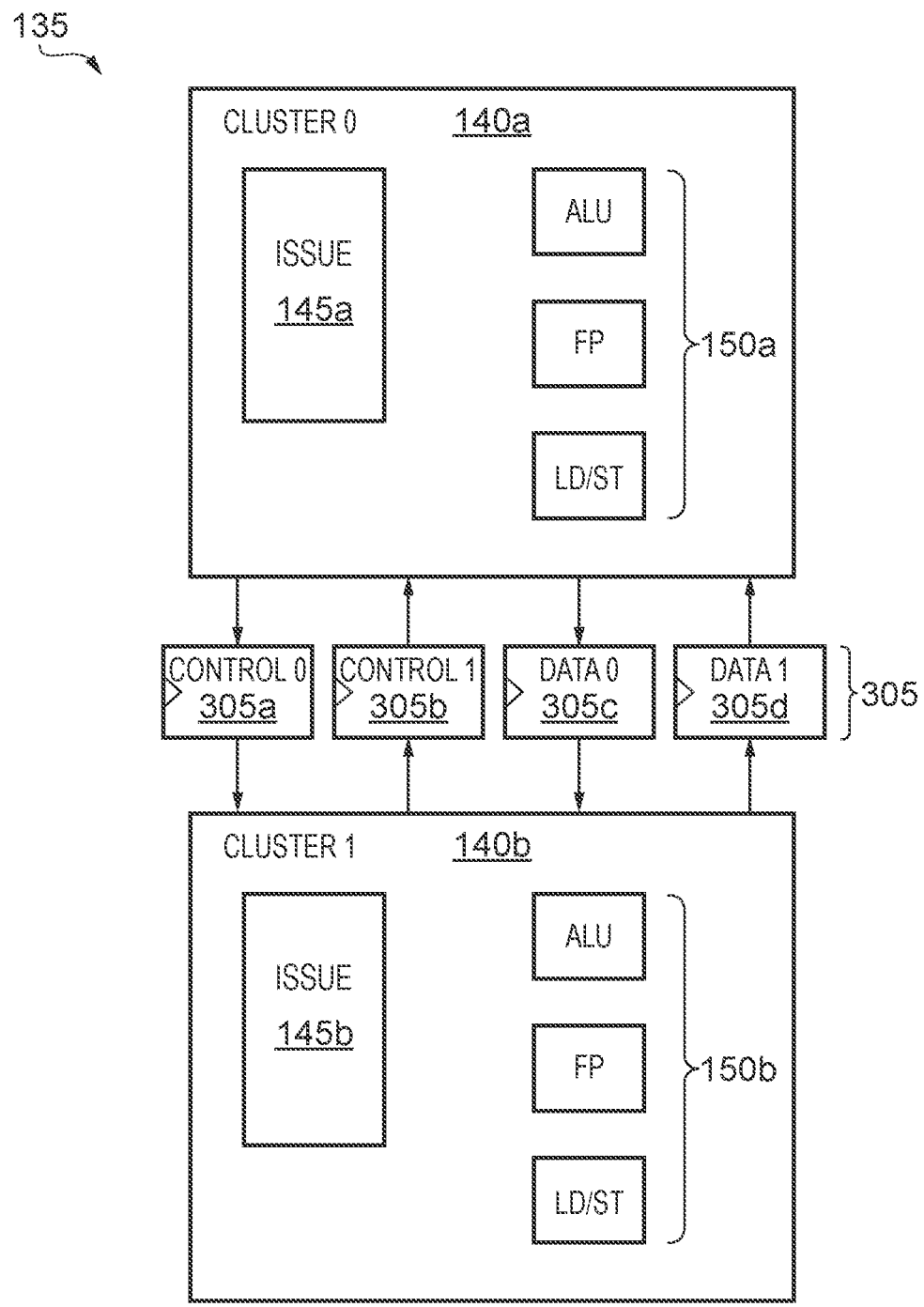
FIG. 3 schematically depicts execution circuitry according to an example implementation.

FIG. 3 schematically depicts one possible implementation of the execution circuitry 135 of apparatus 100, according to an example of the present disclosure.

As shown in FIG. 3, the execution circuitry 135 comprises two execution clusters 140a, 140b. Each execution cluster 140a, 140b comprises issue circuitry 145a, 145b implementing an issue queue, and execution units 150a, 150b for example including ALU, FP and LD/ST units.

As a consequence of the physical extent of the cluster circuitry, signals may not able to be transmitted between the execution clusters 140a, 140b within a single clock cycle. Register slices 305 are therefore provided, such that a signal for example from the first cluster 140a to the second cluster 140b is provided from the first cluster 140a to a register slice 305 in a first clock cycle. The signal is stored in the register slice 305, and then transmitted to the second cluster 140b in the next clock cycle. This allows all transmissions to take place within a single clock cycle, at the expense of introducing a one-clock-cycle time penalty for transmissions between the clusters 140a, 140b.

The register slices 305 include a first control slice 305a for storing transmissions of control information (explained in more detail below) from the first cluster 140a to the second cluster 140b, a second control slice 305b for storing transmissions of control information from the second cluster 140b to the first cluster 140a, a first data slice 305c for storing transmissions of data from the first cluster 140a to the second cluster 140b, and a second data slice 305d for storing transmissions of data from the second cluster 140b to the first cluster 140a.

In one example, each cluster 140a, 140b comprises arbitration circuitry to select particular instructions from the respective issue circuitry 145a, 145b for providing to the respective execution units 150a, 150b for execution. An indication of this selection can be provided as feedback to the issue circuitry 145a, 145b of both clusters 140a, 140b, via the appropriate control slice 305a, 305b for the communication between clusters. This information helps the issue circuitry determine which of its pending instructions are candidates for being issued to the execution units, since an instruction will not be issued until it is known that its source operands will be available by the time it is executed, and hence by telling the issue circuits which instructions have been issued this enable the source operand availability tracking information to be updated. An example of this will now be described in terms of a selection by the issue circuitry 145a of the first cluster 140a.

Arbitration circuitry of the first cluster 140a selects an instruction for issuing from the issue circuitry 145a. The arbitration circuitry of the first cluster 140a feeds back an indication of this selection to the issue circuitry 145a of the first cluster 140a, and also the issue circuitry 145b of the second cluster 140b via the first control slice 305a. This information can be taken into account in selecting instructions for issuing from the issue circuitry 145b of the second cluster 140b. For example, an instruction can be issued for which the source operand is determined by the instruction that was issued within the first cluster 140a (i.e. an instruction that is dependent on the instruction that was issued within the first cluster 140a), even if execution of that instruction has not finished such that the source operand is not yet available in the register bank 155 of apparatus 100 (and provided any other required source operand is also available). This source operand can be provided from the first cluster 140a to the second cluster 140b via the first data slice 305c.

Control information and data can therefore be passed between the clusters 140a, 140b, albeit incurring a time penalty as described above. This time penalty can be mitigated by taking dependency information into account when dispatching instructions, as described above in relation to FIG. 2.

Apparatuses and methods are thus provided for improving processing performance in processing apparatuses that implement parallel execution clusters, in particular where a time penalty is incurred for transmissions between such clusters.

From the above description it will be seen that the techniques described herein provides a number of significant benefits. In particular, the techniques provide an advantageous trade-off between dispatching instructions serially to one execution cluster, and dispatching instructions in parallel to different execution clusters.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
a plurality of clusters, each cluster having a plurality of execution units to execute instructions; and
dispatch circuitry to:
determine, for each instruction to be executed, a chosen cluster from amongst the plurality of clusters to which to dispatch that instruction for execution, by selecting between:
a default dispatch policy wherein said chosen cluster is a cluster to which an earlier instruction to generate at least one source operand of said instruction was dispatched for execution; and
an alternative dispatch policy for selecting said chosen cluster,
said selecting being based on a selection parameter, and
dispatch said instruction to the chosen cluster for execution,
wherein the selection parameter is an indication of a dependency density associated with instructions received by the dispatch circuitry, and
wherein the dispatch circuitry is configured to select the alternative dispatch policy responsive to a determination that the dependency density is below a threshold.

2. An apparatus according to claim 1, wherein the selection parameter is based on dependency information associated with instructions received by the dispatch circuitry.

3. An apparatus according to claim 1, wherein the dependency density is an indication of an average dependence distance of the instructions received by the dispatch circuitry.

4. An apparatus according to claim 1, comprising threshold determination circuitry, wherein:
the clusters are configured to feed back to the threshold determination circuitry performance information associated with executed instructions; and
the threshold determination circuitry is configured to dynamically update the threshold based on the fed back performance information.

5. An apparatus according to claim 4, wherein the threshold determination circuitry is configured to update the threshold to seek to improve overall performance of the plurality of clusters.

6. An apparatus according to claim 1, wherein the dispatch circuitry is configured:
responsive to a determination of a dispatch inhibiting event associated with said instruction, to perform said selecting; and
responsive to a determination of a lack of the dispatch inhibiting event associated with said instruction, to dispatch said instruction according to the default dispatch policy.

7. An apparatus according to claim 6, wherein the dispatch inhibiting event is that said chosen cluster according to the default dispatch policy is currently unable to accept said instruction.

8. An apparatus according to claim 1, wherein the alternative dispatch policy comprises selecting the chosen cluster to seek to balance workload between the plurality of clusters.

9. An apparatus according to claim 1, wherein the dispatch circuitry is configured to perform said selecting in dependence on a determination of dependency sensitivity of said received instruction.

10. An apparatus according to claim 9, wherein the dispatch circuitry is configured to determine a dependency sensitivity of said received instruction responsive to a determination that said earlier instruction has not yet completed execution.

11. An apparatus according to claim 9, wherein the dispatch circuitry is configured to determine a lack of dependency sensitivity of said received instruction if each source operand for said received instruction is stored in a corresponding register of the apparatus.

12. An apparatus according to claim 9, wherein the dispatch circuitry is configured, responsive to a determination of a lack of dependency sensitivity of said received instruction, to dispatch said received instruction to one of the plurality of clusters to seek to balance workload between the plurality of clusters.

13. An apparatus according to claim 1, wherein a time penalty is associated with transmission of signals between clusters of the plurality of clusters, relative to transmission of signals between execution units of a given cluster of the plurality of clusters.

14. An apparatus comprising:
a plurality of clusters, each cluster having a plurality of means for executing instructions; and
means for determining, for each instruction to be executed, a chosen cluster from amongst the plurality of clusters to which to dispatch that instruction for execution, by selecting between:
a default dispatch policy wherein said chosen cluster is a cluster to which an earlier instruction to generate at least one source operand of said instruction was dispatched for execution; and
an alternative dispatch policy for selecting said chosen cluster,
said selecting being based on a selection parameter, and
means for dispatching said instruction to the chosen cluster for execution,
wherein the selection parameter is an indication of a dependency density associated with instructions received, and
wherein the means for determining is configured to select the alternative dispatch policy responsive to a determination that the dependency density is below a threshold.

15. A method comprising:
for each of a plurality of received instructions to be executed by a plurality of execution clusters, determining a chosen cluster from amongst the plurality of clusters to which to dispatch that instruction for execution, by selecting between:
a default dispatch policy wherein said chosen cluster is a cluster to which an earlier instruction to generate at least one source operand of said instruction was dispatched for execution; and an alternative dispatch policy for selecting said chosen cluster, and dispatching said instruction to the chosen cluster, said selecting being based on a selection parameter, wherein the selection parameter is an indication of a dependency density associated with instructions received by the dispatch circuitry, and wherein the alternative dispatch policy is selected in response to a determination that the dependency density is below a threshold.

* * * * *